Patented Jan. 1, 1952

2,581,050

UNITED STATES PATENT OFFICE 2,581,050

METHOD FOR THE PRODUCTION OF DIMETHYL SULFOXIDE

Tor Halfdan Smedslund, Helsingfors, Finland, assignor to Aktiebolaget Centrallaboratorium, Helsinki, a corporation No Drawing. Application July 19, 1948, Serial No. 39,580. In Sweden July 18, 1944

Section 1, Public Law 690, August 8, 1946
Patent expires July 18, 1964

11 Claims. (Cl. 260—607)

This invention relates to a method for the production of dimethyl sulfoxide by a catalytic oxidation of dimethyl sulfide in the vapor phase.

The principal object of the present invention is to provide a method for the oxidation of dimethyl sulfide to dimethyl sulfoxide without the production of any significant quantity of higher oxidation products. Another object of the invention is to provide a simplified process requiring less control over the concentration of the reactants and other conditions in the reaction zone to produce a satisfactory yield of the product desired. Other objects of the invention include the provision of a more economical method for the production of dimethyl sulfoxide from cheap raw materials in relatively inexpensive apparatus with high concentration and yield of product.

Several methods for oxidizing organic sulfides to the corresponding sulfoxide have been proposed with each method adapted to the chemical and physical properties of the particular sulfide used and the sulfoxide to be produced therefrom. All of these methods have been carried out in the liquid phase. With the product soluble in either the solvent used or the reduced oxidizing agent special operations for separating the product from the reaction mixture are required. Furthermore, the sulfoxides, as primary oxidation products with the sulfur atom at the tetravalent stage, readily undergo further oxidation to sulfones in which the sulfur atom is hexavalent. Consequently, most of the commonly used oxidizing agents easily oxidize both the sulfides and their primary oxidations products, the sulfoxides, to sulfones unless very careful control of the concentration of reactants and the temperature of the reaction is maintained.

The production of dimethyl sulfoxide by the oxidation of dimethyl sulfide with oxidation agents, such as dilute nitric acid, hydrogen peroxide and bromine water, has been so unsuccessful commercially that the sulfoxide hitherto has been only of scientific interest.

In the operation of the present invention, a gaseous mixture of dimethyl sulfide vapor and air, air enriched with oxygen, or pure oxygen is provided. A small amount of oxygen transmitting nitrogen oxide, such as nitrogen dioxide or nitric oxide, is introduced into the gaseous mixture to serve as a catalyst. The resulting mixture is passed through a reaction chamber under atmospheric pressure and without external heating. The oxidation of the sulfide stops at the sulfoxide stage and no sulfone is formed. Since no liquid solvents are used the product is highly concentrated and may be purified easily to the extent to which its use requires.

One example of the operation of the process of the present invention is given for the oxidation of dimethyl sulfide with oxygen in the presence of nitric oxide catalyst. A current of oxygen at the rate of 370 ml. per min. was bubbled through a 30 cm. layer of dimethyl sulfide maintained at 26.5° C., thereby producing a gaseous mixture containing the stoichiometric amount of oxygen required for the oxidation of the sulfide to sulfoxide. Nitric oxide at the rate of 30 ml. per min. was added to the gaseous mixture as it passed into the first of a series of four reaction chambers, each consisting of a glass tube 4.3 cm. in diameter and 100 cm. in length. The reaction started immediately, the temperature of the reaction mixture reached a maximum of about 75° C. in the first two tubes where most of the reaction occurred, and the reaction slowed down in the last two tubes. The crude, yellow product, which dropped from the tubes, contained about 10 per cent dimethyl sulfide, about 2 per cent dissolved nitrogen dioxide, about 2 per cent methane sulfonic acid, and some water. The crude product was refluxed at 100° C. for 30 minutes and the escaping gas was passed into the first reaction chamber. The dimethyl sulfide was removed by then heating the product to 150° C., the methane sulfonic acid was neutralized by adding slaked lime, and the dimethyl sulfoxide was distilled in vacuum. The yield of pure dimethyl sulfoxide (B. P. 63° C. at 6 mm. Hg) was 85 per cent of the theoretical yield from the evaporated dimethyl sulfide.

Another example of the operation of the process of the present invention is given for the oxidation of dimethyl sulfide with air in the presence of nitrogen dioxide catalyst. Dimethyl sulfide was evaporated at the rate of 0.7 g. per min. into an air current of 680 ml. per min. Nitrogen dioxide was introduced into the resulting gaseous mixture at the rate of 40 ml. per min. and the reaction was carried out in the same manner as in the preceding example. However, in this case the reaction was slower as shown by the temperature rise to only 45° C. in the first reaction tube and to 30° C. in the last tube. The crude, product contained about 5 per cent dimethyl sulfide, about 2 per cent nitrogen dioxide, about 1 per cent methane sulfonic acid, and some water. After purification as in the preceding example, the yield of the pure dimethyl sulfoxide was 75 per cent of the theoretical yield.

The dimethyl sulfide required for the production of dimethyl sulfoxide may be produced synthetically in different ways known to the art or may be obtained as a by-product, such as, from the production of sulfate pulp or the refining of crude petroleum.

In the vapor phase process of the present invention, the oxidizing agent is gaseous oxygen. The use of oxygen alone, the use of air alone, or the use of mixtures of air and oxygen has been found to be suitable for the operation of the present process.

The proportion between the oxidizing agent and the dimethyl sulfide should be kept as near to the stoichiometric ratio as possible. A deficiency of oxygen causes some of the sulfide to remain unoxidized whereas as excess of oxygen causes an undesired decrease in catalyst concentration. The stoichiometric ratio may be maintained readily by saturating a gas with the vapor of a liquid by bubbling the gas through the liquid while it is maintained at a constant temperature such that the resulting vapor pressure of the liquid corresponds to the composition desired. Dimethyl sulfide is maintained at 26.5° C. to produce the required vapor composition in oxygen and at 5.8° C. to produce the proper vapor composition in air.

The catalyst used in the present process is described as an oxygen transmitting nitrogen oxide and when so designated is intended to mean nitric oxide, nitrogen trioxide, nitrogen dioxide, or any mixture thereof. The catalyst is introduced continuously into the gaseous mixture of dimethyl sulfide and the oxidizing agent entering the reaction zone. The concentration of the catalyst in the reaction mixture is decisive for the reaction velocity, and consequently for the size of the reaction chambers. If too much catalyst is used the temperature of the reaction may rise excessively, say over 70° C., and secondary reactions begin. On the other hand, if too small amount of catalyst is used the oxidation rate may be so low that a very large reaction zone will be required. A suitable quantity of nitric oxide or nitrogen dioxide corresponds to 5 liters of nitrogen equivalent per kilogram of dimethyl sulfide under treatment using oxygen as the oxidizing agent and to 15 liters of nitrogen equivalent per kilogram using air as the oxidizing agent. Under such conditions the production of one kilogram of dimethyl sulfoxide per hour requires a reaction volume in the order of 100 liters with oxygen and 300 liters with air.

The amount of the oxygen transmitting nitrogen oxide catalyst used represents only 5 to 15 per cent of the amount of nitric acid equivalent required for oxidation in the liquid phase, thereby clearly showing the catalytic character of the reaction. The amount of nitrogen oxide required may be reduced further by the recovery from the effluent gases and recycling in the process.

The reaction zone should be located preferably in a system of large diameter tubular chambers connected in series. Since the present process does not require external heating or operation under high pressure, the construction and operation of the apparatus for the operation of the process affords a considerable technical improvement in the manufacture of dimethyl sulfoxide.

The crude dimethyl sulfoxide discharged from the reaction chambers contains small amounts of dimethyl sulfide, methane sulfonic acid and nitrogen dioxide, which will vary somewhat depending upon the oxidizing agent used, the concentration of catalyst and the temperature of reaction. The crude product may be refluxed at 100° C. for about half an hour, whereby the dimethyl sulfide reduces the nitrogen dioxide to nitric oxide, and the escaping gases passed into the reaction zone. Any dimethyl sulfide remaining may be removed by heating the product to 150° C. After neutralization of the methane sulfonic acid, the partially purified sulfoxide is distilled in vacuum. A fractional distillation may be required if an anhydrous product is desired.

The yield of pure, anhydrous dimethyl sulfoxide amounts to 75 to 85 per cent of the theoretical yield from the dimethyl sulfide under treatment.

The production of dimethyl sulfoxide may be of considerable importance technically. A mixture of dimethyl sulfoxide and water produces a low freezing point fluid, which may serve as a refrigerant and a seal for hydraulic brakes. By reason of its hygroscopicity dimethyl sulfoxide may be used in place of glycerine as a softening agent in the graphic arts and in the leather and textile industries. Dimethyl sulfoxide is an excellent solvent for gases, such as acetylene and sulfur dioxide, and may be used as a paint and varnish remover.

This application is a continuation-in-part of my application Serial No. 623,447, filed October 19, 1945, now abandoned.

I claim:

1. A continuous method for the production of dimethyl sulfoxide by the vapor phase oxidation of dimethyl sulfide, which comprises mixing at substantially atmospheric pressure and temperature dimethyl sulfide vapors with an oxygen containing gas, containing sufficient oxygen to oxidize the dimethyl sulfide to the sulfoxide, and with a small amount of oxygen transmitting nitrogen oxide sufficient only to catalyze the oxidation reaction without causing the temperature to rise above about 75° C. and insufficient to furnish oxygen for the said oxidation reaction, passing the resulting gaseous mixture through a reaction zone of large volume while retaining the mixture in said zone until the dimethyl sulfide is oxidized substantially to dimethyl sulfoxide.

2. The method according to claim 1 wherein oxygen alone is supplied to provide the gaseous mixture of oxidizing agent and dimethyl sulfide vapor.

3. The method according to claim 1 wherein a mixture of oxygen and air is supplied to provide the gaseous mixture of oxidizing agent and dimethyl sulfide vapor.

4. The method according to claim 1 wherein air alone is supplied to provide the gaseous mixture of oxidizing agent and dimethyl sulfide vapor.

5. The process of claim 1 wherein said reaction zone comprises tubular chambers of large diameter connected in series.

6. A continuous method for the production of dimethyl sulfoxide by the vapor phase oxidation of dimethyl sulfide which comprises introducing into a stream of a gaseous mixture, comprising oxygen as the oxidizing agent and dimethyl sulfide vapor, at substantially atmospheric pressure and temperature an amount of oxygen transmitting nitrogen oxide as a catalyst in the order of 5 to 15 per cent of such nitrogen oxide equivalent required for the oxidation of the sulfide to sulfoxide and passing the resulting mixture through a reaction zone of large volume in which the mixture is maintained at a temperature not substantially exceeding about 75° C. for a time sufficient for the dimethyl sulfide to be oxidized substantially to dimethyl sulfoxide.

7. The method according to claim 6 wherein the amount of oxygen transmitting nitrogen oxide so introduced is equivalent to 3 to 30 liters of nitrogen per kilogram of dimethyl sulfide under treatment.

8. The method according to claim 6 wherein oxygen alone is supplied to provide the gaseous mixture into which the oxygen transmitting nitrogen oxide is introduced and the amount of nitrogen oxide introduced is in the order of 5 liters of nitrogen equivalent per kilogram of dimethyl sulfide under treatment.

9. The method according to claim 6 wherein air alone is supplied to provide the gaseous mixture into which the oxygen transmitting nitrogen oxide is introduced and the amount of nitrogen oxide introduced is in the order of 15 liters of nitrogen equivalent per kilogram of dimethyl sulfide under treatment.

10. A continuous method of producing dimethyl sulfoxide which comprises continuously passing a stream of an oxygen-containing gas through liquid dimethyl sulfide maintained at a temperature varying from approximately 5.8° C. when the oxygen-containing gas is air to a temperature of approximately 26.5° C. when the oxygen-containing gas is oxygen to produce a gas mixture containing a substantially stoichiometric ratio of oxygen and dimethyl sulfide, continuously adding to the resulting gaseous stream an amount of oxygen transmitting nitrogen oxide as a catalyst in the order of from about 5 to 15 liters of nitrogen equivalent per kilogram of the dimethyl sulfide present, passing the resulting mixture through a reaction zone of large volume in which the mixture is maintained for a time sufficient for the dimethyl sulfide to be oxidized substantially to dimethyl sulfoxide, at a temperature not substantially exceeding 75° C. and recovering dimethyl sulfoxide from the reaction products.

11. The process of claim 10 wherein the reaction products are refluxed at a temperature of about 100° C. and the nitrogen oxide gases evolved are recycled and introduced in the gaseous stream of oxygen-containing gas and dimethyl sulfide.

TOR HALFDAN SMEDSLUND.

REFERENCES CITED

The following references are of record in the file of this patent:

UNITED STATES PATENTS

| Number | Name | Date |
|---|---|---|
| 1,864,541 | Hermann | June 28, 1932 |

FOREIGN PATENTS

| Number | Country | Date |
|---|---|---|
| 442,524 | Great Britain | Feb. 10, 1936 |

OTHER REFERENCES

Suter: "Organic Chemistry of Sulfur," 1944, Wiley and Sons, N. Y., pages 660, 661.